Oct. 15, 1968  R. J. MILLER  3,405,666
PALLET ASSEMBLY
Filed Feb. 10, 1967  3 Sheets-Sheet 1
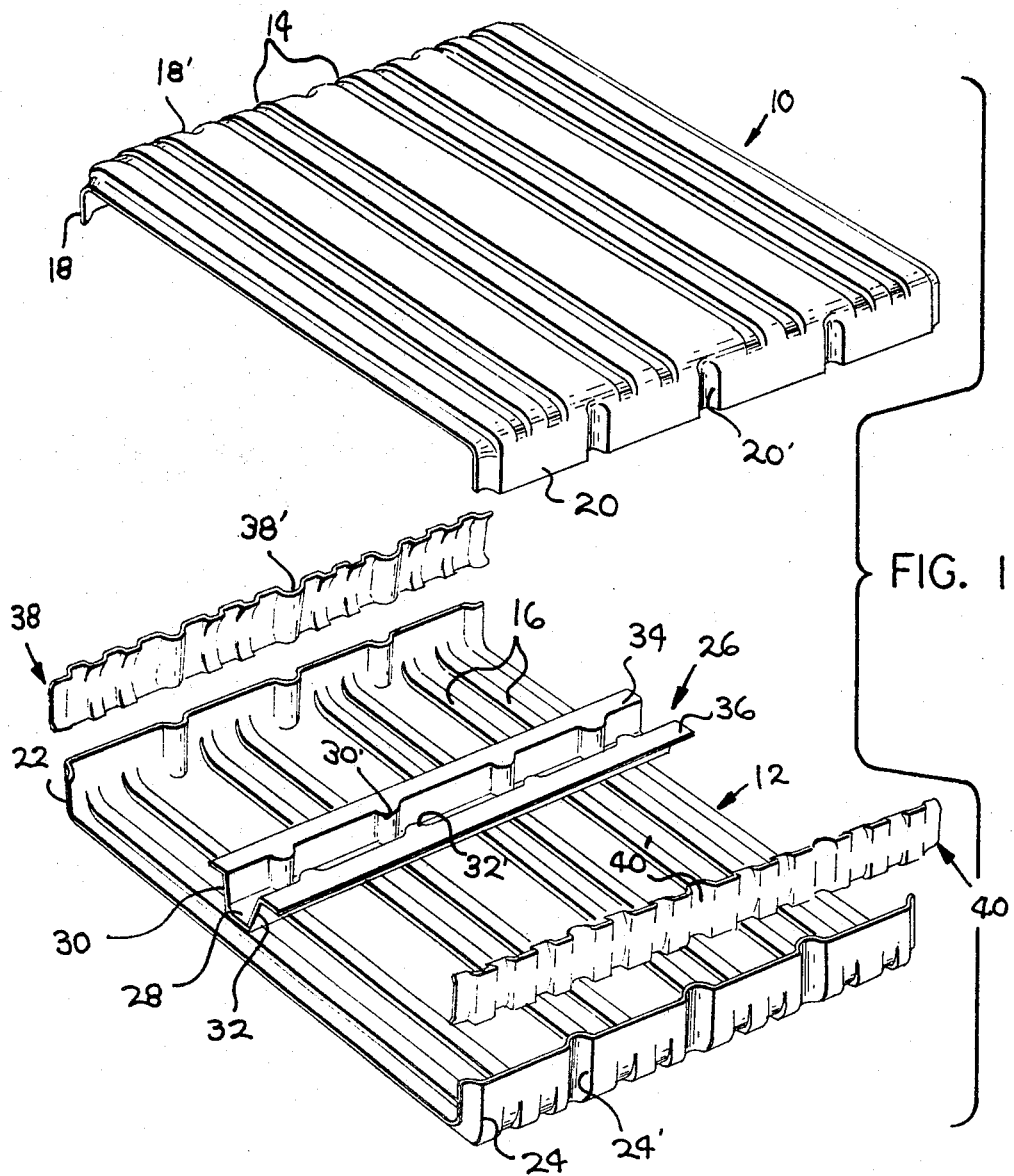
INVENTOR.
RICHARD J. MILLER
BY
Fraser, Wilson + Fraser
ATTORNEYS Oct. 15, 1968  R. J. MILLER  3,405,666
PALLET ASSEMBLY Filed Feb. 10, 1967  3 Sheets-Sheet 2

INVENTOR.
RICHARD J. MILLER
BY
*Frann, Wilson Hrann*
ATTORNEYS

Oct. 15, 1968  R. J. MILLER  3,405,666
PALLET ASSEMBLY

Filed Feb. 10, 1967  3 Sheets-Sheet 3

INVENTOR.
RICHARD J. MILLER
BY
Fraser, Wilson + Fraser
ATTORNEYS

United States Patent Office 3,405,666
Patented Oct. 15, 1968

3,405,666
PALLET ASSEMBLY
Richard J. Miller, Toledo, Ohio, assignor to Sheller-Globe Corporation, Toledo, Ohio, a corporation of Ohio
Filed Feb. 10, 1967, Ser. No. 615,252
7 Claims. (Cl. 108—58)

ABSTRACT OF THE DISCLOSURE

A plastic pallet having identical upper and lower deck members with depending terminal ends which cooperate in the assembled form such that the edges of the terminal ends are in direct alignment so that the load imposed on the deck members places the ends in compression.

BACKGROUND OF THE INVENTION

Field of the invention

The invention pertains to a platform wherein a surface thereof is of brief height for supporting a load relatively close to the floor or primary support, and having means to receive handling means beneath said surface or load.

Description of the prior art

Industrial platforms or pallets have been known for some time and have been fabricated from wood, metal, and plastic materials. Wooden pallets are typically quite heavy and have a relatively short duty cycle by virtue of the fact that in use the wood is caused to become splintered and broken apart. A wooden pallet with splintered sections or rough-supporting areas will readily rupture or tear the thin walled containers which would be supported thereon. Pallets fabricated from metallic stock are typically quite heavy and are subject to oxidation which limits the materials which can be supported thereon. Plastic pallets have been employed which are of acceptable weight and may be readily maintained in a state of cleanliness, but typically do not have the strength characteristicstics found necessary for wide application of use.

SUMMARY

The general objects and advantages of the invention may be achieved by a pallet assembly comprising upper and lower deck members having an extended surface portion with at least two opposing terminal end portions depending in the same direction at substantially right angles to the extended surface portion, the upper and lower deck members being assembled in mirror-image relation with the edge of the terminal end portions of the upper deck member in butting relation with the edge of the terminal end portion of the lower deck member; reinforcing strip means substantially coextensive with the length of the terminal end portion of the deck members; and adhesive means for securing the reinforcing strip means to the exposed surfaces of the depending end portions of cooperating ones of the upper and lower deck members to maintain the edges thereof in direct alignment with each other whereby the load imposed upon the pallet will place the terminal end portions of the upper and lower deck members and the reinforcing strip means in compression.

It is an object of the present invention to produce a pallet fabricated from plastic material which is light in weight, easily cleaned, readily and economically manufactured, and has compressive strength to withstand substantial loads.

BRIEF DESCRIPTION OF THE DRAWINGS

A more complete understanding of the objects and advantages of the invention will become readily apparent from reading the following detailed description in the light of the accompanying drawing in which:

FIGURE 1 is an exploded perspective view of a pallet assembly incorporating the features of the invention;

DESCRIPTION OF THE PREFERRED EMBODIMENTS

Figure 3:
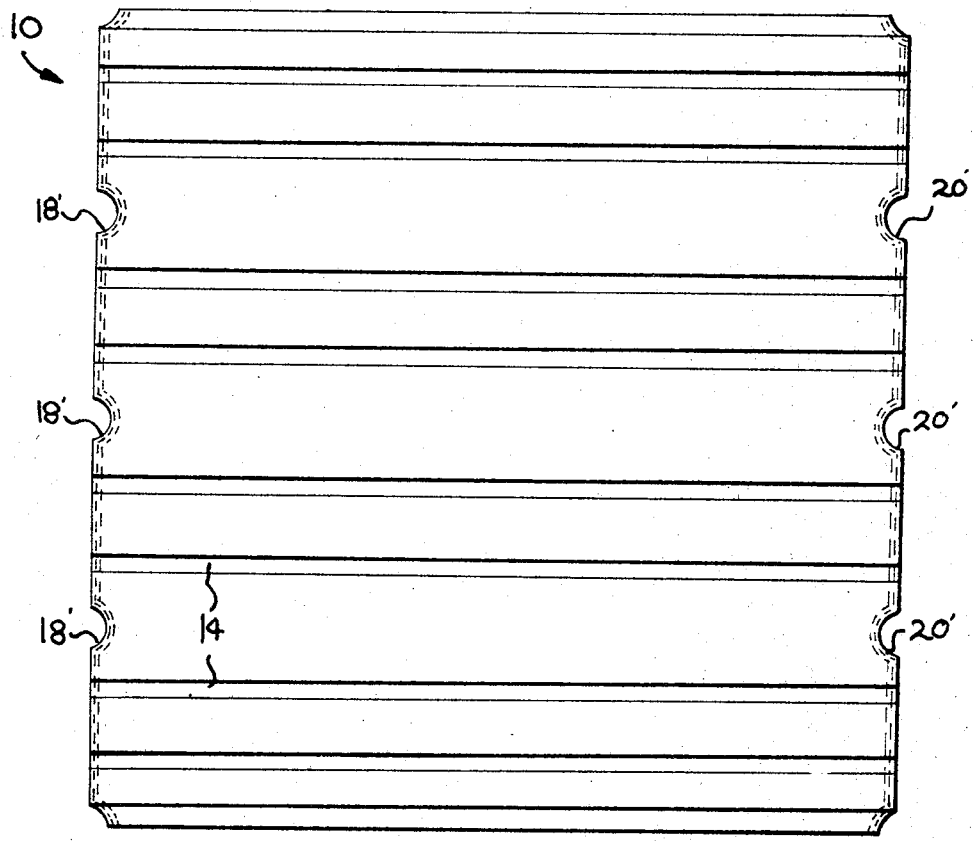
FIGURE 3 is a top-plan view of the pallet assembly illustrated in FIGURES 1 and 2.
Figure 2:
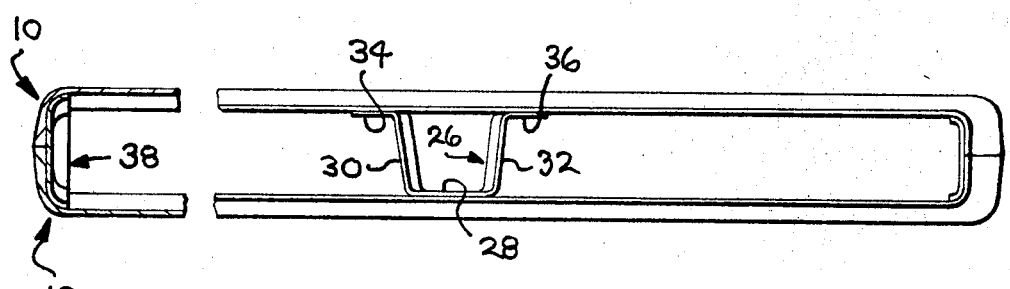
FIGURE 2 is a front elevational view of the pallet assembly illustrated in FIGURE 1.

Referring to FIGURES 1, 2, and 3, there is shown a pallet assembly comprising an upper deck member 10 and an identical lower deck member 12. The deck members 10 and 12 have an extended surface portion provided with reinforcing impressions preferably in the form of a plurality of longitudinally extending parallel spaced-apart corrugations 14 and 16, respectively. The corrugations 14 and 16 have generally flat-bottom walls and flat side walls. The upper and lower deck members have their opposing terminal end portions 18, 20, 22 and 24 depending in the same direction at substantially right angles to the associated extended surface portion of the respective deck member. The terminal deck portions 18, 20, 22 and 24 preferably taper outwardly to become thicker at the outermost free edges thereof.

At intervals along the depending terminal end portions 18, 20, 22 and 24 there are formed pluralities of spaced-apart hemicylindrical impressions 18', 20', 22' and 24', respectively. These hemicylindrical impressions function as reinforcing means and impart compressional strengthening means to the assembly when the upper and lower deck members are assembled, as will become manifest from the following description.

A channel-shaped cross member 26, coextensive with the width of the deck members 10 and 12, is adapted to be positioned between the upper and lower deck members approximately midway between the depending terminal end portions thereof. The cross member 26 has a flat base 28 from each side of which extends a side wall 30 and 32. The side walls 30 and 32 are typically provided with the plurality of spaced hemicylindrical reinforcing impressions 30' and 32', respectively. The side walls 30 and 32 are terminated in laterally extending longitudinal pads 34 and 36. The combined area of the pads 34 and 36 is preferably substantially equal to the area of the base 28.

In order to maintain the butting realtionship between the free edges of the depending terminal end portions 18 and 22 and the edges of the terminal end portions 20 and 24, there is provided a pair of identical reinforcing strips 38 and 40. The reinforcing strips 38 and 40 are each provided with a plurality of spaced hemicylindrical reinforcing impressions 38' and 40', respectively, which are of the same configuration and are adapted to mate with the corresponding hemicylindrical reinforcing impressions 18', 20', 22' and 24' of the depending terminal end portions 18, 20, 22 and 24. Also, the zones on the opposite sides of each of the hemicylindrical reinforcing impressions 38' and 40' are formed so as to mate with the terminal end portions of the corrugations 14 and 16 of the upper and lower deck members 10 and 12, respectively.

It has been found that by forming the elements of the pallet assembly thus far explained of a polyester resin with a fiber glass reinforcement, excellent results have been achieved. In fabricating the pallet assembly, the resin, filler, retardant, and a catalyst are mixed together and poured into a suitable mold which contains the reinforcement material such as a fiber glass mat, scrim cloth, or the like, which is preferably resin impregnated to maintain the general shape thereof. After the resin mix is poured into the mold, pressure is suitably applied to the assembly by closing the mold or by utilization of other pressure means and the assembly is then cured, typically by the application of heat. After the resin has cured, the individual elements of the assembly are removed from their respective molds and after any undesired flashing is removed from the elements, the elements are ready for final assembly.

Initially, in achieving the final assembly, the outer surfaces of the reinforcing strips 38 and 40, the inner surfaces of the depending terminal end portions of the upper and lower panels 10 and 12, the lower surface of the base 28 and the upper surface of the pads 34 and 36 of the cross member 26 are wiped with a degreasing agent, such as toluene or naphtha, to remove surface contaminants such as dirt, oil, and the like. The parts are then placed on a conveyor and so positioned that adhesive materials such as epoxy or polyester resin can be applied, either automatically or by hand, as the parts move to an assembly point. At the assembly point, the parts are placed in a suitable fixture to effect contact between the adhesive contact areas thereby assembling the elements of the pallet assembly into an integral unit. By the proper control of time and temperature, the assembly is allowed to cure.

In certain instances, it is contemplated that metal staples, such as stainless steel staples or other inert materials, may be employed to retain the individual parts of the pallet in the assembled form to allow the adhesive to set up or cure to form a rigid strong unitized assembly.

It will be appreciated that in the assembled form, the cross member 26 in effect divides the opening formed by the upper and lower deck members into two equal openings thereby leaving adequate space on either side thereof for the reception of the fork element of an associated fork lift truck. In the event it is found to be desirable to further strengthen the assembly, one or more additional cross members may be added.

It has been found that excellent results have been achieved by fabricating the pallet assembly of a polyester resin having a filler material such as calcium carbonate, sawdust, clay, diatomaceous earth, barium sulfate, ground cork, bark fibers or asbestos; a catalyst such as barium peroxide; and a retardant such as styrene. It will be understood that other resins such as a phenolic or epoxy may be likewise satisfactorily employed.

Figure 4:
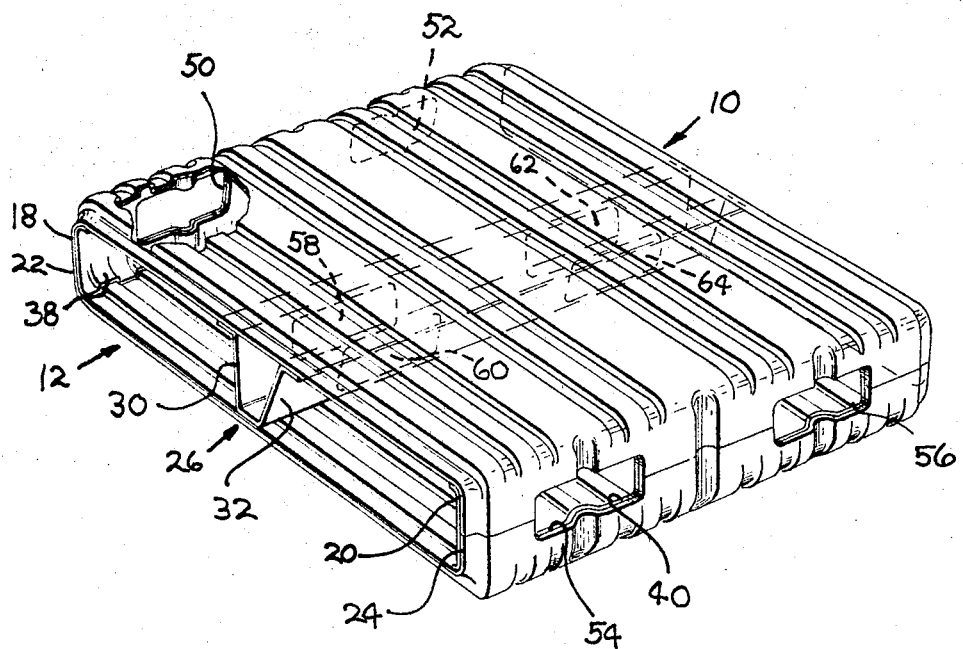
FIGURE 4 is a perspective view of a modified form of a pallet assembly incorporating the features of the invention suitable for four-way entry by the fork of an associated lift truck.

FIGURE 4 shows a modification of the pallet assembly illustrated in FIGURES 1, 2 and 3. The modified form of the pallet assembly of FIGURE 4 is designed for four-way entry by the fork of an associated fork lift truck and is provided with a pair of openings 50 and 52 formed in the cooperating terminal end portions 18 and 22 of the upper and lower deck members 10 and 12 and the associated reinforcing strip 38. A pair of similar openings 54 and 56 are formed in the cooperating terminal end portions 20 and 24 of the upper and lower deck members 10 and 12 and the associated reinforcing strip 40.

Aligned with the openings 50 and 54, there is provided a pair of openings 58 and 60 in the spaced side walls 30 and 32 of the cross member 26. Similarly, aligned with the openings 52 and 56, there is provided a pair of openings 62 and 64 in the spaced side walls 30 and 32 of the cross member 26.

The modified form of the invention illustrated in FIGURE 4 may receive the spaced forks of a fork lift truck in the space on either side of the cross member 26 from the opposite side of the pallet assembly: in the spaced openings 50 and 52; or alternatively, in the spaced openings 54 and 56.

Figure 5:
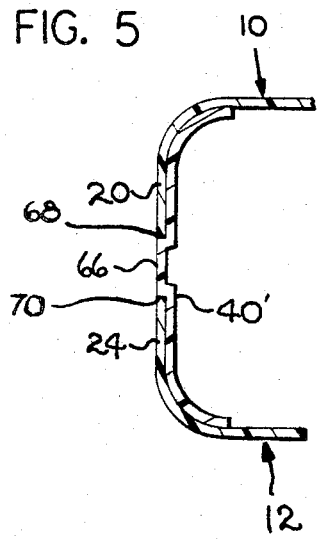
FIGURE 5 is an enlarged fragmentary elevational view in section illustrating a modified form of the reinforcing strip means.

FIGURE 5 shows a modification of the pallet assembly wherein the spacing between the upper and lower deck members 10 and 12 is increased through the employment of a modified form of the reinforcing strip means. The reinforcing strip means 40' includes an outwardly extending rib-like section 66 which typically provides an upper and lower shoulder portion 68 and 70, respectively for supportingly receiving the edges of the terminal end portions 20 and 24 of the upper and lower deck members 10 and 12, respectively. In the assembled form of the pallet, the edges of the terminal end portion are in direct alignment so that any load imposed on the pallet assembly will place the terminal end portions and the associated reinforcing strip means in compression.

From the foregoing description, it may be seen that the invention has produced a pallet assembly which weighs less than corresponding pallets made from wood or metal for similar load handling characteristics. Also, the pallet assembly of the invention is dimensionally stable; may be exposed to weather conditions without deleterious effects; and is readily maintained in a state of cleanliness. Further the pallet assembly may be economically manufactured since molds need be fabricated for three separate elements; namely, one used to mold the upper and lower deck members 10 and 12; one used to mold the reinforcing strips 38 and 40; and one mold to mold the cross member 26.

In accordance with the provisions of the patent statutes, I have explained the principles and mode of operation of my invention, and have illustrated and described what I now consider to represent its best embodiments. However, I desire to have it understood that, within the scope of the appended claims, the invention may be practiced otherwise than as specifically illustrated and described.

What I claim is:

1. A pallet assembly comprising:
   upper and lower deck members having an extended surface portion with at least opposing terminal end portions depending in the same direction at substantially right angles to the extended surface portion, said upper and lower deck members being assembled in mirror-image relation with the edge of the terminal end portions of said upper deck member in direct alignment with the edge of the terminal end portions of said lower deck member;
   reinforcing strip means substantially coextensive with the length of the terminal end portions of said deck members; and
   adhesive means for securing said reinforcing strip means to the exposed surfaces of the depending end portions of cooperating ones of said upper and lower deck members to maintain the edges thereof in direct alignment with each other, whereby the load imposed on the pallet will place the terminal end portions of said upper and lower deck members and said reinforcing strip means in compression.

2. A pallet assembly as defined in claim 1 wherein said edges are in butting relation.

3. A pallet assembly as defined in claim 1 wherein said upper and lower deck members are provided with reinforcing impressions therein.

4. A pallet assembly as defined in claim 2 wherein said reinforcing impressions are positioned in spaced parallel relation with respect to one another.

5. A pallet assembly as defined in claim 1 wherein the depending end portions of said upper and lower deck members are provided with hemicylindrical reinforcing impressions.

6. A pallet assembly as defined in claim 1 wherein said reinforcing strip means includes a single continuous strip for joining each pair of cooperating terminal end portions of said upper and lower deck members.

7. A pallet assembly as defined in claim 1 including a pair of spaced apart fork receiving apertures in each of the opposing terminal end portions of said upper and lower deck members.

References Cited

UNITED STATES PATENTS

| | | | |
|---|---|---|---|
| 2,928,638 | 3/1960 | Parker | 108—52 |
| 2,933,339 | 4/1960 | Alvden | 108—58 |
| 3,160,120 | 12/1964 | Skubie | 108—53 |
| 3,187,689 | 6/1965 | Hess | 108—58 |
| 3,269,336 | 8/1966 | Naylor et al. | 108—58 |
| 3,307,504 | 3/1967 | Cloyd et al. | 108—58 |
| 3,159,115 | 12/1964 | Nolan | 108—51 |

BOBBY R. GAY, *Primary Examiner.*

G. O. FINCH, *Assistant Examiner.*